US011282138B2

(12) United States Patent
Melton

(10) Patent No.: US 11,282,138 B2
(45) Date of Patent: Mar. 22, 2022

(54) INFORMATIONAL INCENTIVES FOR SUBMITTING MAKER ORDERS

(71) Applicant: REFINITIV US ORGANIZATION LLC, New York, NY (US)

(72) Inventor: Hayden Paul Melton, Philadelphia, PA (US)

(73) Assignee: REFINITIV US ORGANIZATION LLC, New York, NY (US)

(*) Notice: Subject to any disclaimer, the term of this patent is extended or adjusted under 35 U.S.C. 154(b) by 226 days.

(21) Appl. No.: 15/628,670

(22) Filed: Jun. 21, 2017

(65) Prior Publication Data

US 2017/0372421 A1    Dec. 28, 2017

Related U.S. Application Data

(60) Provisional application No. 62/354,154, filed on Jun. 24, 2016.

(51) Int. Cl.
*G06Q 40/04* (2012.01)
*H04L 51/226* (2022.01)
*G06Q 40/06* (2012.01)
*H04L 51/224* (2022.01)

(52) U.S. Cl.
CPC ............. *G06Q 40/04* (2013.01); *G06Q 40/06* (2013.01); *H04L 51/24* (2013.01); *H04L 51/26* (2013.01)

(58) Field of Classification Search
CPC ................................ G06Q 40/04; G06Q 40/06
USPC ........................................................ 705/37
See application file for complete search history.

(56) References Cited

U.S. PATENT DOCUMENTS

| 8,612,323 B1* | 12/2013 | Frait ................ G06Q 30/0207 |
| | | 705/35 |
| 11,037,243 B2 | 6/2021 | Nuti |
| 2004/0177024 A1* | 9/2004 | Bok ..................... G06Q 40/06 |
| | | 705/37 |
| 2005/0234805 A1 | 10/2005 | Robertson |
| 2005/0262005 A1* | 11/2005 | Woolston .............. G06Q 40/04 |
| | | 705/37 |
| 2007/0100733 A1* | 5/2007 | Huizing ................ G06Q 40/04 |
| | | 705/37 |
| 2008/0243675 A1* | 10/2008 | Parsons ................. G06Q 40/00 |
| | | 705/37 |

(Continued)

OTHER PUBLICATIONS

5-Page Specficiation from U.S. Appl. No. 62/293,848 ("Priority Matching for Maker Orders Exhibiting Delayed Cancelation"), filed Feb. 11, 2016 by Inventor Hayden Melton. (Year: 2016).*

(Continued)

*Primary Examiner* — Abdulmajeed Aziz
*Assistant Examiner* — Timothy T. Hsieh
(74) *Attorney, Agent, or Firm* — Katy Chan-Parsons; Bartholomew J. DiVita

(57) ABSTRACT

Disclosed is a system and method for incentivizing participants on an electronic trading venue to post competitively priced bids or offers onto that venue. Participants that post such bids and offers are rewarded by a venue implementing the invention by being sent more frequent (and/or enhanced) market data updates over participants who do not, while those bids and offers remain active and competitive. Participants that receive more frequent market data updates from a venue may have an informational advantage in their trading over those participants that receive less frequent updates.

23 Claims, 7 Drawing Sheets

(56) References Cited

U.S. PATENT DOCUMENTS

| | | | | |
|---|---|---|---|---|
| 2012/0271748 A1* | 10/2012 | DiSalvo | ............... | G06Q 40/04 |
| | | | | 705/37 |
| 2013/0282549 A1* | 10/2013 | Howorka | ............... | G06Q 40/04 |
| | | | | 705/37 |
| 2014/0188682 A1 | 7/2014 | Singer | | |
| 2015/0019618 A1 | 1/2015 | Brookfield | | |
| 2015/0127514 A1 | 5/2015 | Studnitzer | | |
| 2015/0356679 A1* | 12/2015 | Schmitt | ............... | G06Q 40/06 |
| | | | | 705/37 |
| 2017/0103462 A1* | 4/2017 | Peck-Walden | ......... | G06Q 40/04 |
| 2017/0236202 A1* | 8/2017 | Melton | ............... | G06Q 40/04 |
| | | | | 705/37 |

OTHER PUBLICATIONS

5-Page Specficiation from U.S. Appl. No. 62/293,848 ("Priority Matching for Maker Orders Exhibiting Delayed Cancelation"), filed Feb. 11, 2016 by Inventor Hayden Melton. (Year: 2016) (Year: 2016) (Year: 2016) (Year: 2016) (Year: 2016) (Year: 2016) (Year: 2016) (Year: 2016) (Year: 2016).*

C. Leber et al., High Frequency Trading Acceleration Using FPGAs, 2011 21st International Conference on Field Programmable Logic and Applications, pp. 317-322 (Year: 2011).*

"EBS Market Moves Towards Real-Time FX Market Data", NEX Markets, Feb. 29, 2016, <http://www.ebs.com/news-and-events/2016/20160229_ebs_market_moves_towards_real-time_fx_market_data aspx>, 2 pages.

"Market Maker Protection Model—NASDAQ OMX Derivatives Markets—Equity Derivatives", Version 1.1, May 21, 2010, <http://www.nasdaqomx.com/digitalAssets/71/71976_market_maker_protection_model_-_equity_derivatives_1.1.pdf>, 16 pages.

Detrixhe, John, et al., "ICAP Gambles on Super Fast Currency Data with Strings Attached", Aug. 2, 2016, <http://www.bloomberg.com/news/articles/2016-08-02/icap-gambles-on-super-fast-currency-data-with-strings-attached>, 4 pages.

EBS Rulebooks, NEX Markets, [no date], <http://www.ebs.com/platforms/rulebook.aspx>, 2 pages.

MEMORANDUM from Securities and Exchange Commission ("SEC") Division of Trading and Markets, Re: Maker-Taker Fees on Equities Exchanges, Oct. 20, 2015, <https://www.sec.gov/spotlight/emsac/memo-maker-taker-fees-on-equities-exchanges.pdf>, 40 pages.

* cited by examiner

INFORMATIONAL INCENTIVES FOR SUBMITTING MAKER ORDERS

CROSS-REFERENCE TO RELATED APPLICATIONS

This application claims priority to U.S. Provisional Patent Application No. 62/354,154, filed Jun. 24, 2016, entitled "Dynamically Enhanced Per Participant Market Data Distribution," which is incorporated by reference in its entirety herein.

FIELD OF THE INVENTION

The invention specifies systems and methods for increasing the transmission frequency of and/or other enhancements to market data updates for market participants that submit competitive maker orders relative to other market participants that do not submit such orders.

BACKGROUND OF THE INVENTION

It is common for electronic trading venues to incentivize or protect participants that make (cf. take) prices. Forms of incentives in use today include rebates currently paid by US equities exchanges for orders that make prices and are ultimately filled, and improved queue position in the limit order book for Designated Market Makers who have obligations to make a two-sided price that is say no wider than X basis points for Y hours during the day. Forms of protection currently offered to makers include "last look" in some FX venues, and "delta protection" on derivative contracts on various exchanges.

The reason that venues tend to incentivize making over taking, is that without makers of prices there are no prices for takers to hit. The more makers on a venue, generally, the tighter the spreads as those makers compete with one another to be the best price (highest bid and/or lowest offer), and takers of liquidity will naturally be attracted to venues with tight spreads as has been a saying in financial markets since the 1980's: "liquidity begets liquidity". Growing trading volumes is an ongoing goal of market operators and incentivizing making is a widely-accepted approach to this.

Most Electronic Trading Venues ("ETVs") reveal to market participants the prevailing supply and demand for the instruments that trade thereon by way of market data updates. The content of and frequency at which these market data updates are sent to participants varies by venue. Certain ETVs, such as Thomson Reuters Matching, are known to distribute only time-sliced or conflated market data to participants, while processing order messages received by participants in real-time. What this means, on such venues, is that there are "dark" periods between market data updates for an instrument where participants do not know the true state of the limit order book for that instrument because matching and the process of inserting/removing orders from the instrument's book will generally be occurring during these periods.

If some participants were able to see the state of the book for an instrument, in real-time, as orders that were received for that instrument, those participants may have an informational advantage in their trading activities over other participants who could only see the book at time-sliced intervals. However, because of the almost instant nature of order processing through electronic networks, various problems arising from these technical advances occur when providing informational advantages to some but not all market participants.

These and other drawbacks exist with conventional systems for processing orders in an ETV.

SUMMARY OF THE INVENTION

The invention addressing these and other drawbacks relates to systems and methods for incentivizing submission of competitive maker orders in an electronic trading venue by providing enhanced market data updates to market participants that submit competitive maker orders as compared to market participants that do not submit competitive maker orders, according to an implementation of the invention. More generally speaking, the system may provide enhanced market data updates to certain market participants. An enhanced market data update is a market data update that is provided to at least one market participant, but is not provided to at least one other market participant, and includes a characteristic that is not included in a market data update generally available to other market participants.

Such characteristic may include, without limitation, an increased frequency of market data updates (e.g., a market participant may receive more frequent market data updates than other market participants), additional information not provided to other market participants (e.g., a market participant may be provided with additional or different information not provided to other market participants such as contain more depth of book data, more last traded price related data, etc.), and/or other enhancements.

An enhanced market data update may be triggered by an action that a market participant takes. In this implementation, the market participant may be incentivized to take that action in order to receive an enhanced market data update. Examples of such action may include, without limitation, submission of a competitively-priced maker order, submission of an order in which the spread on a bid and offer both entered by the same participant no wider than X pips where X may vary by time zone and instrument, and/or other actions. Whether or not a maker order is considered "competitive" may be predefined by an operator of the venue. One example is where a given order is at the top of the book for a given instrument, or is within the top N price levels of the top of the book (where N is an integer), and/or other ways in which to determine whether a given maker order is "competitive."

In an implementation, the system may transmit, at a first frequency, market data update information from the matching engine to the one or more market data distributors, wherein the market data update information reflects a state of an order book at a given time. The system may generate, by the first market data distributor, at a second frequency less than the first frequency, periodic market data updates, the periodic market data updates including at least a first market data update based on first market data update information available to the first market data distributor at a first time and a second market data update based on second market data update information available to the first market data distributor at a second time, wherein a time between the first time and the second time is based on the second frequency.

The system may transmit, from the first market data distributor, the periodic market data updates to a device of each market participant to which the first market data distributor is coupled. The system may determine that a first market participant, from among market participants to which the first market data distributor is coupled, has submitted a competitive maker order relating to a first instrument. The system may generate, by the first market data distributor, based on the determination that the first market participant has submitted the competitive maker order, an enhanced market data update for the first market participant, but not for at least one other market participant. The system may transmit, by the first market data distributor, the enhanced market data update to a device of the first market participant, wherein the first market data distributor does not transmit the enhanced market data update to another device of the at least one other market participant.

The systems and methods present various advantages and technical solutions to problems inherent to computerized and networked electronic trading venues. In some instances, for example, to address problems that arise with computerized and networked trading venues, market data distributors may implement various safeguards. For instance, in computerized and networked trading venues, orders can be submitted and canceled within short periods of time. Some market participants may take advantage of this and submit competitive orders in order to obtain enhanced market data update messages, and then cancel its competitive orders before such orders may be filled (e.g., taken by other market participants). In order to address this problem arising out of computerized and networked trading venues, market data distributors may employ various messaging strategies and/or wait an amount of time after receiving an enhanced message before actually providing an enhanced market data update.

Furthermore, the systems and methods incentivize submission of maker orders on a venue, which in turn may result in tighter spreads, which in turn may result in more taking on that venue, which ultimately may result in increased trading volumes.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for increasing the transmission frequency of and/or providing other enhancements to market data updates for market participants that submit competitive maker orders as compared to market participants that do not submit competitive maker orders. More generally speaking, the system may provide enhanced market data updates to certain market participants. An enhanced market data update is a market data update that is provided to at least one market participant, but is not provided to at least one other market participant, and includes a characteristic that is not included in a market data update generally available to other market participants. Such characteristic may include, without limitation, an increased frequency of market data updates (e.g., a market participant may receive more frequent market data updates than other market participants), additional information not provided to other market participants (e.g., a market participant may be provided with additional or different information not provided to other market participants such as contain more depth of book data, more last traded price related data, etc.), and/or other enhancements.

An enhanced market data update may be triggered by an action that a market participant takes. In this implementation, the market participant may be incentivized to take that action in order to receive an enhanced market data update. Examples of such action may include, without limitation, submission of a competitive maker order, submission of an order in which the spread on a bid and offer both entered by the same participant no wider than X pips" where X may varies by time zone and instrument, and/or other actions. Whether or not a maker order is considered "competitive" may be predefined by an operator of venue 110. One example is where a given order is at the top of the book for a given instrument, is within the top N price levels of the book (where N is an integer), and/or other ways in which to determine whether a given maker order is "competitive."

Other types of actions may trigger enhanced market data updates as well.

Having described a high level overview of system functions, attention will now be turned to an exemplary architecture for facilitating these and related functions.

Figure 1:
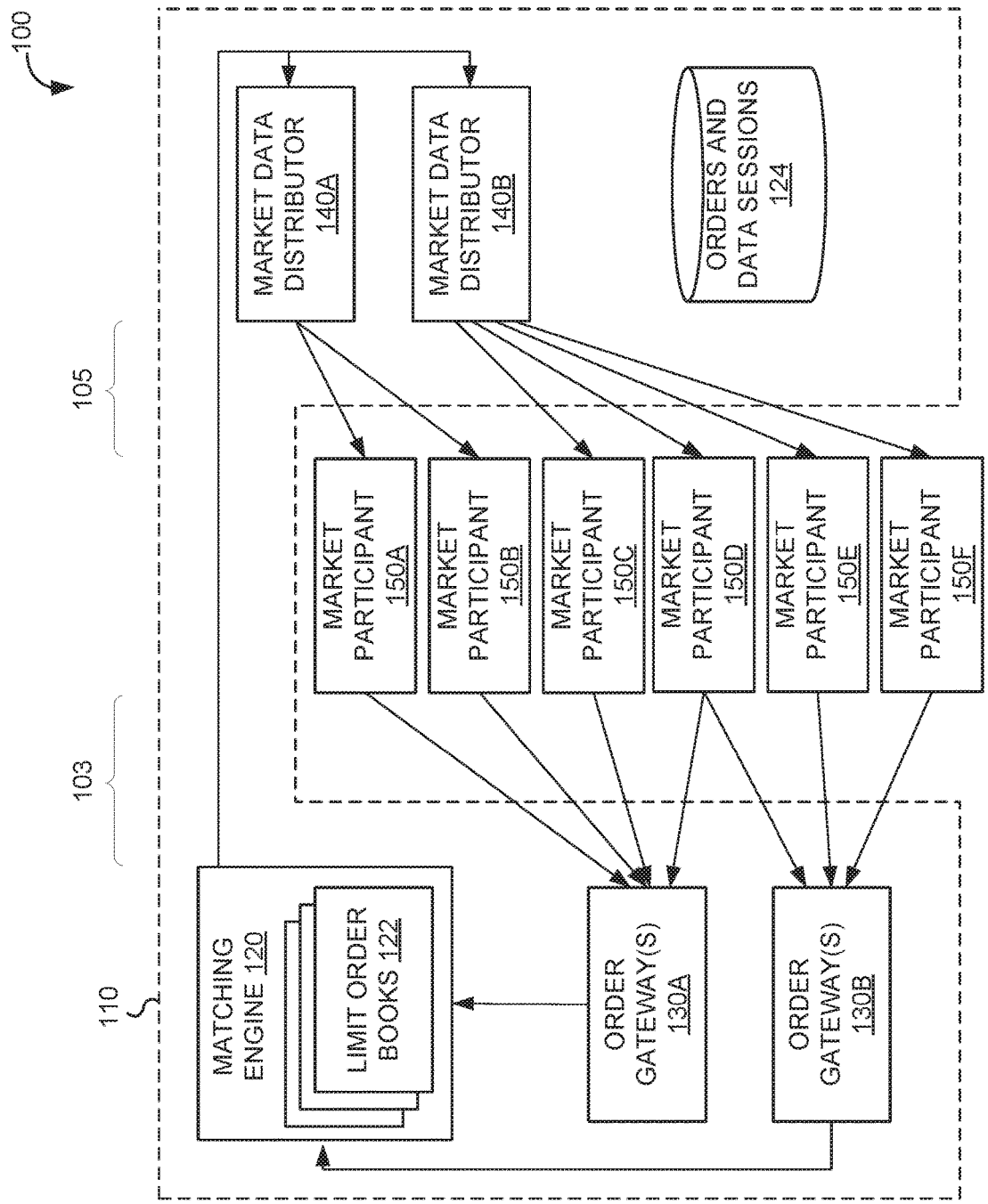
FIG. 1 illustrates an exemplary system for increasing the transmission frequency of and/or other enhancements to market data updates for market participants that submit competitive maker orders as compared to market participants that do not submit competitive maker orders, according to an implementation of the invention.

FIG. 1 illustrates an exemplary system 100 for increasing the transmission frequency of and/or providing other enhancements to market data updates for market participants that submit competitive maker orders as compared to market participants that do not submit competitive maker orders, according to an implementation of the invention.

System 100 may include electronic trading venue 110 (used interchangeably with "venue 110" or "ETV 110" for convenience) and one or more market participants 150 (i.e., devices of market participants). For example, the one or more market participants 150 may include market participant 150A, market participant 150B, market participant 150C, market participant 150D, market participant 150D, market participant 150F, . . . , and/or market participant 150N. Market participants 150 (also referred to interchangeably as "participants 150" for convenience) are, for example, those entities that conduct business on venue 110 using devices to interface with ETV 110.

In an implementation, ETV 110 may include one or more matching engines 120, one or more order gateways 130, one or more market data distributors 140 (e.g., market data distributor 140A, market data distributor 140B, and/or one or more other market data distributors), and/or other components. Matching engine 120 may receive orders (e.g., cancels, replaces, new order requests, etc.) from market participants 150 via one or more order gateways 130 (e.g., order gateway 130A, order gateway 130B, and/or one or more other order gateways). These orders may be formatted according to a FIX message format, although other types of formats may be additionally or alternatively used. Market participants 150 may log onto venue 110 and the venue may create an order session 103. During a given order session, a market participant 150 may submit orders through order gateway 130. The order sessions may be stored in an orders and sessions database 124. The stored order sessions 103 may log the orders, which may each identify a market participant 150 that submitted it and its order details. Order gateways 130 transmit the orders to matching engine 120.

Based on the orders, matching engine 120 may maintain one or more limit order books 122, which may track a bid or offer state for the instruments that trade on them. A bid or offer state is indicative of bids and/or offers with respect to the instrument. One example of a bid or offer state is the state of a central limit order book ("CLOB"), although other types of mechanisms may be used to track bid or offer states. The term "CLOB" is used by example and not limitation. Other ways to maintain a bid or offer state may be used as well so as aggregate supply and demand, perform matching, organize orders, etc., on a given instrument or group of instruments. Point-in-time "snapshots" of bid or offer states are distributed from the venue 110 to market participants as market data updates. Such updates may also include additional information that, depending on one's viewpoint may or may not be considered part of the bid or offer state, such as the price and quantity of the last trade that occurred on an instrument.

Providing Continuous Market Update Information From a Matching Engine to Market Data Distributors, and Periodic Market Data Updates from the Market Data Distributors to Market Participants Matching engine 120 may continuously provide (at a first frequency) market data update information to market data distributors 140. The market data update information may include real-time (e.g., continuously provided as information is available) information from the limit order books 122. For example, each time a new order is received by matching engine 120, a limit order book 122 is updated based on the received order. The matching engine 120 may generate market update information reflecting the updated limit order book and transmit the market update information to the market data distributors 140. In other words, a new order may trigger generation and transmission of market date update information that reflects the new order. In some instances, the market data update information includes a copy of the limit order book 122. Each market data distributor 140 may generate market data updates based on the market data update information from matching engine 120, and transmit the market data updates to market participants 150 that are logged onto it.

A given market data update may be based on market data update information available to a market data distributor 140 at a given time. For example, while a market data distributor 140 may receive continuously (at a first frequency) updated market data update information from a matching engine 120, the market data distributor 140 may generate and provide a market data update to market participants only periodically, and at a frequency that is less than the first frequency with which it receives market data update information from the matching engine 120.

Figure 3A:
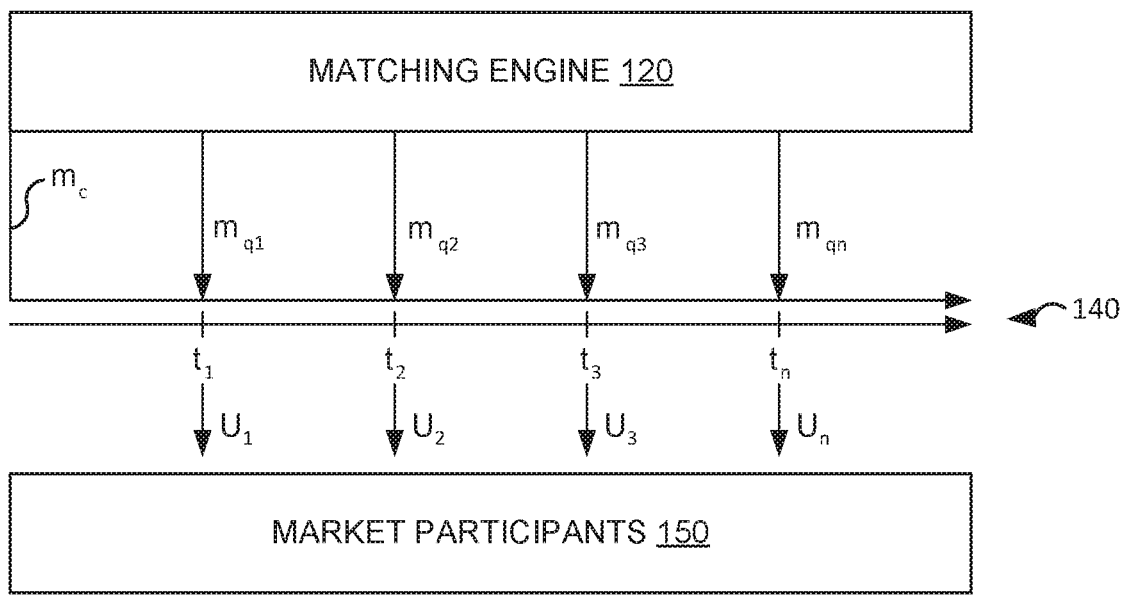
FIG. 3A illustrates a diagram that depicts a process for continuously transmitting market data update information at a first frequency from a matching engine to a market data distributor and triggering periodic market date updates based on multicast messages at a second frequency less than the first frequency, which provides market data updates to market participants responsive to the messages, according to an implementation of the invention.

FIG. 3A illustrates a diagram that depicts a process for continuously transmitting market data update information at a first frequency from a matching engine to a market data distributor and triggering periodic market date updates based on multicast messages at a second frequency less than the first frequency, which provides market data updates to market participants responsive to the messages, according to an implementation of the invention.

In some implementations, matching engine 120 continuously transmits (e.g., at a first frequency) messages (represented in FIG. 3A as a bent arrow labeled as mc) that include market update information, which is updated in real-time as orders are received, to market data distributors 140. Matching engine 120 may periodically transmit (e.g., at a second frequency less than the first frequency) multicast messages (represented in FIG. 3A as "quantum" messages $m_{q1\ldots n}$) to market data distributors 140. The frequency may be every 100 milliseconds or other frequency predefined by an operator of ETV 110. Each quantum message ($m_q$) may be in addition to the continuous, streaming market data information matching engine 120 transmits to the market data distributors 140. In response to receipt of a quantum message ($m_q$), each market data distributor 140 may process its copy of the market data update information available to it at the time for each instrument, and transmits a market data update ($U_{1\ldots n}$) to market participants 150 to which it is coupled. In this manner, in the time between quantum messages ($m_q$), market data updates are not transmitted to market participants 150. It should be noted that the market participants 150 may continue to send orders into the ETV 110 and those orders may modify the states of those Limit Order Books (i.e., the market data update information). In the foregoing example, ETV 110 provides time-sliced (or conflated) market data, but continuous processing of orders.

Figure 3B:
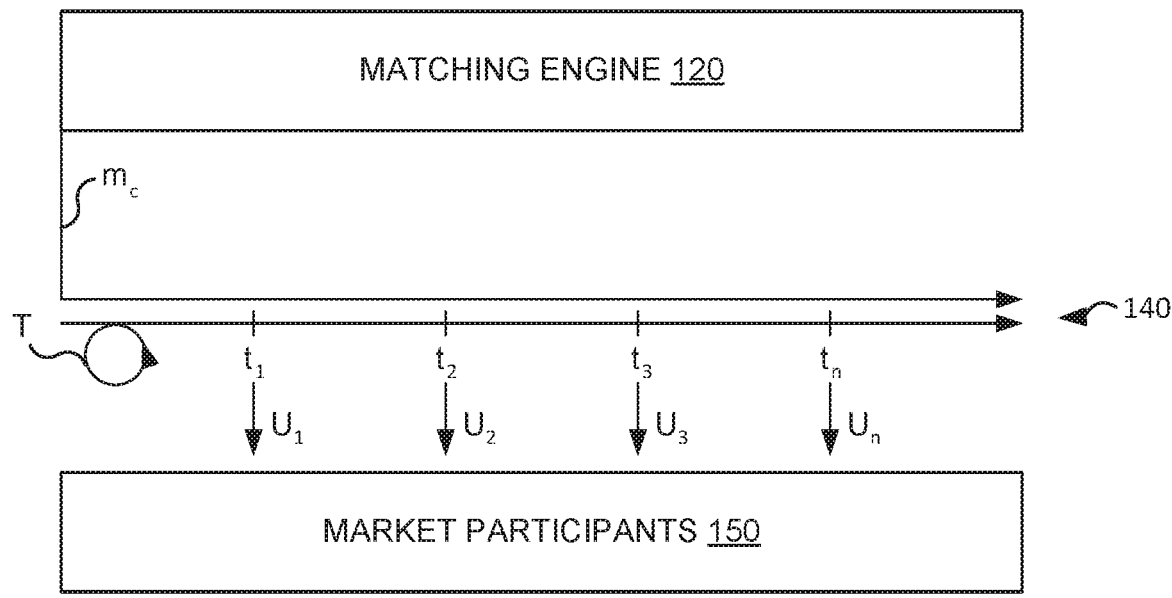
FIG. 3B illustrates a diagram that depicts a process for continuously transmitting market data update information at a first frequency from a matching engine to a market data distributor and triggering periodic market date updates based on electronic timers at a second frequency less than the first frequency, which provides market data updates to market participants responsive to the messages, according to an implementation of the invention.

FIG. 3B illustrates a diagram that depicts a process for continuously transmitting market data update information at a first frequency from a matching engine to a market data distributor and triggering periodic market date updates based on electronic timers at a second frequency less than the first frequency, which provides market data updates to market participants responsive to the messages, according to an implementation of the invention.

The manner of processing continuous messages is similar to that described with respect to FIG. 3A. However, instead of the matching engine 120 dictating when market data distributors 140 should provide market data updates ($U_{1 \ldots n}$) to market participants 150 via quantum messages ($m_q$), each market data distributor 140 may identify when to provide the market data updates. For example, each market data distributor 140 may implement an electronic timer such that market data updates are provided to market participants 150 at certain time intervals corresponding to the second frequency (e.g., every 100 milliseconds). In some instances, a market data distributor 140 may initiate a timer (T) each time it generates and/or transmits a market data update and if the timer reaches a certain time corresponding to the second frequency (e.g., at 100 milliseconds), a market data update will be generated and transmitted to market participants 150. Other methods of using a timer may be used, as would be appreciated by those skilled in the art based on this disclosure.

Figure 5:
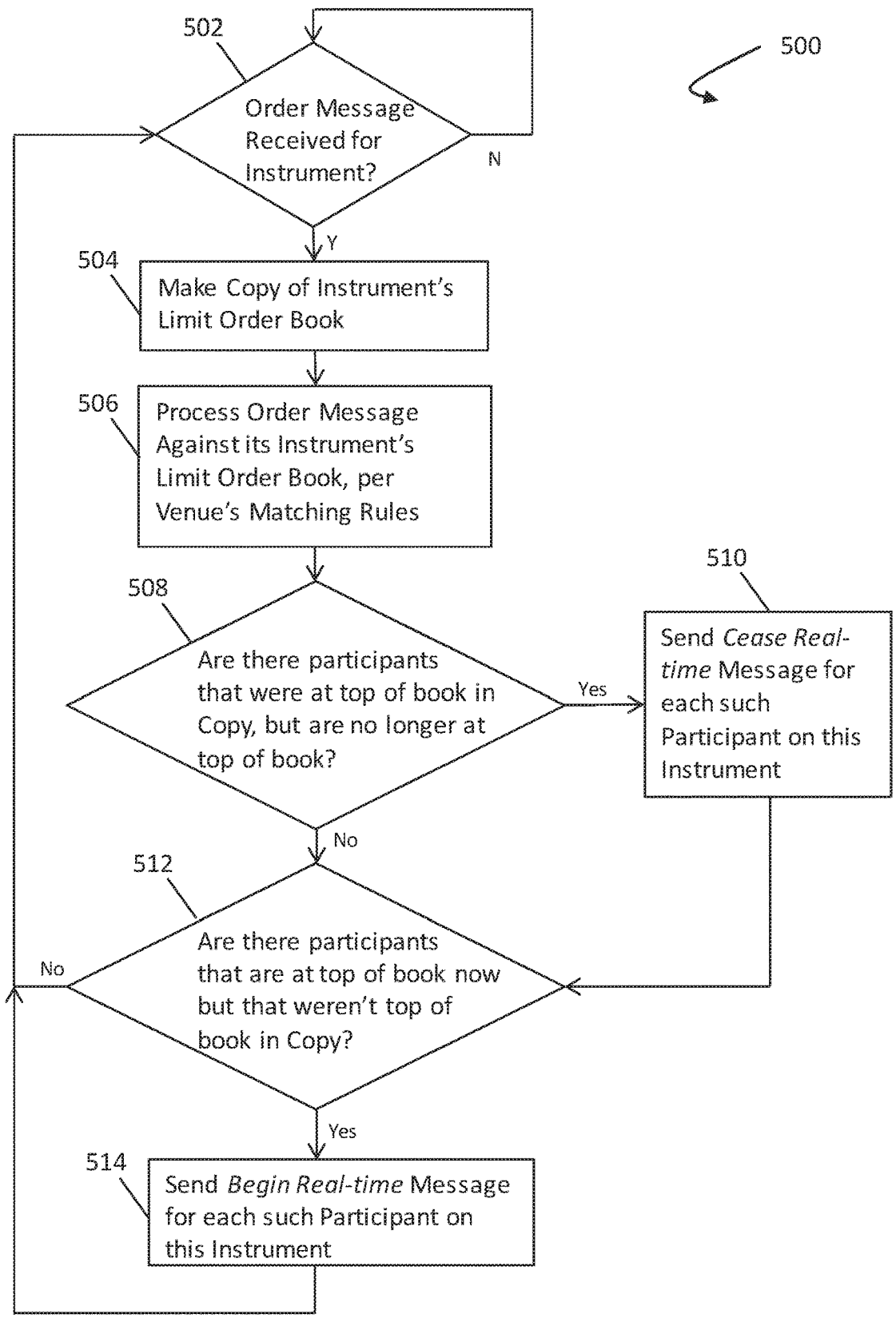
FIG. 5 illustrates an exemplary process for determining whether to provide enhanced market data updates, according to an implementation of the invention.

Identifying Market Participants to Receive Enhanced Market Data Updates and Transmitting Enhanced Market Data Updates to the Identified Market Participants In some implementations, various triggers may initiate enhanced market data updates to be provided to certain market participants 150 and not others. These triggers may be predefined by an operator of ETV 110. An enhanced market data update may be triggered by submission of a competitive maker order, submission of a bid and offer both entered by the same market participant in which the spread is no wider than X pips where X may vary by time zone and instrument, and/or other triggers. The competitive maker order example will be described for illustrative, though not necessarily limiting, purposes. A competitive maker order may be defined as a maker order is at the top of the book (or within the top N price levels of the book). An example of this determination is illustrated in FIG. 5 below.

Figure 3C:
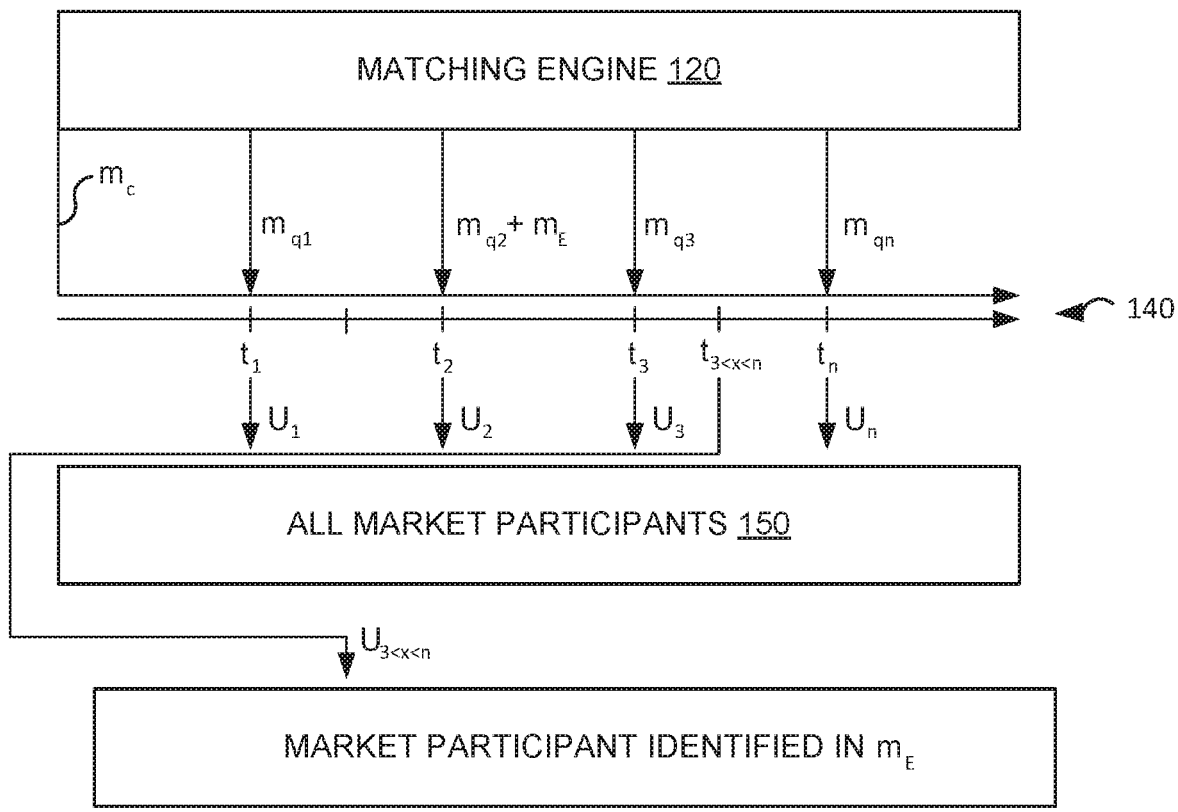
FIG. 3C illustrates a diagram that depicts a process for transmitting messages, including a message for enhanced market data, from a matching engine to a market data distributor, which provides enhanced market data updates to specific market participants, according to an implementation of the invention.

Attention will turn now to FIG. 3C, which illustrates a diagram that depicts a process for transmitting messages, including a message for enhanced market data, from a matching engine to a market data distributor, which provides enhanced market data updates to specific market participants, according to an implementation of the invention.

In an implementation, a new message type (illustrated in FIG. 3C as enhanced message $m_E$) may be transmitted from the matching engine 120 to market data distributors 140. It is noted that the message itself is not necessarily "enhanced" but rather causes enhanced market data updates to be provided. Matching engine 120 may identify market participants that have maker orders in the book meeting one or more conditions (or not meeting it), and sending the new message type responsive to a determination that the one or more conditions have been met. Such conditions may include a condition that the order be competitive, as described herein.

Each market data distributor 140 may accept and process the enhanced message, where the enhanced message's payload indicates the instrument and market participant 150 that should begin to or cease to be sent to real-time market data updates with respect to the instrument.

In some instances, to address problems that arise with computerized and networked trading venues (e.g., ETV 110), market data distributors 140 may implement various safeguards. For instance, in computerized and networked trading venues, orders can be submitted and canceled within short periods of time. Some market participants 150 may take advantage of this and submit competitive orders in order to obtain enhanced market data update messages, and then cancel its competitive orders before such orders may be filled (e.g., taken by other market participants). In order to address this problem arising out of computerized and networked trading venues, market data distributors 140 may wait an amount of time after receiving an enhanced message before actually providing an enhanced market data update.

In the illustrated example, suppose at time $t_2$ an enhanced message ($m_E$) is transmitted from matching engine 120 to market data distributor 140 because a given market participant identified in the enhanced message ($m_E$) submitted a competitive order. Market data distributor 140 may wait an amount of time before actually providing an enhanced market update ($U_{3<x<n}$). As illustrated, for example, market data distributor 140 may wait until after the next multicast message $m_{q3}$ is received before providing the enhanced market update ($U_{3<x<n}$) at time $t_{3<x<n}$ (after time $t_2$ when the multicast message ($m_E$) is transmitted and after the next multicast message $m_{q3}$ is received at time $t_3$). This prevents a given market participant from "gaming" the system as previously described.

Figure 3D:
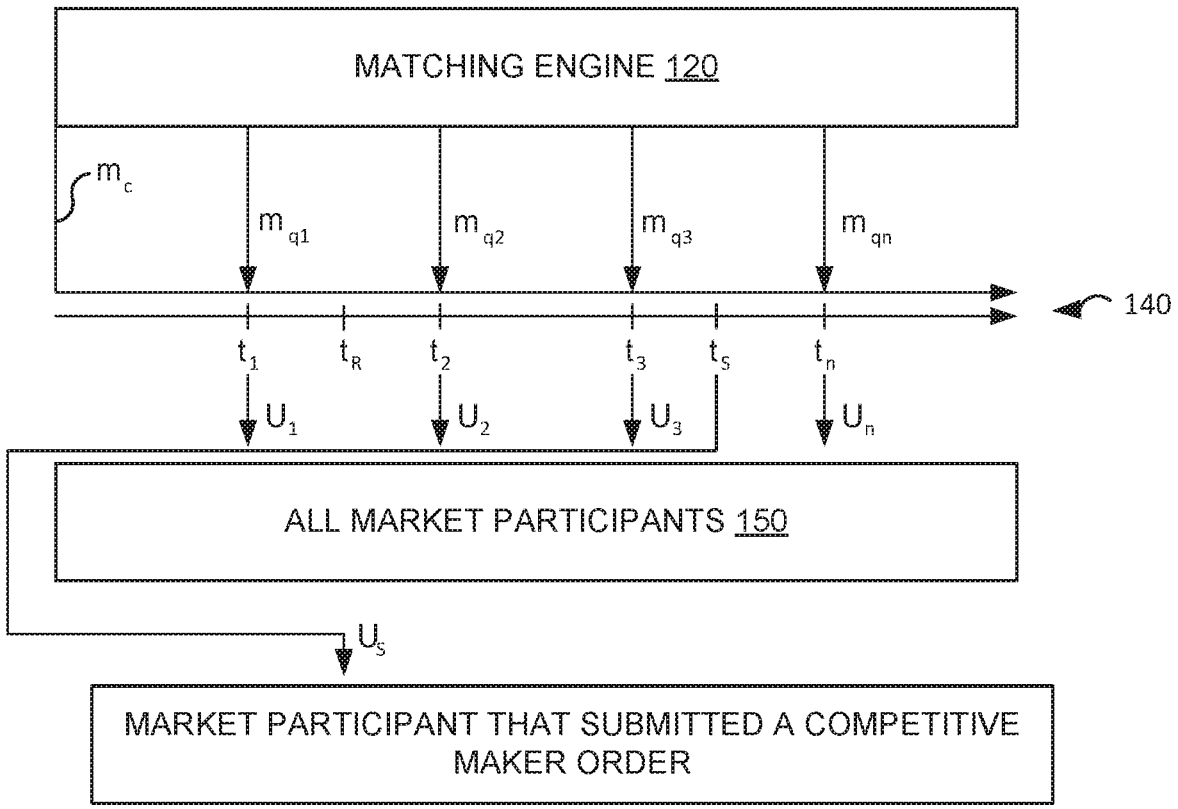
FIG. 3D illustrates a diagram that depicts a process for a market data distributor that provides enhanced market data updates to specific market participants, according to an implementation of the invention.

FIG. 3D illustrates a diagram that depicts a process for a market data distributor that provides enhanced market data updates to specific market participants, according to an implementation of the invention. The manner of processing continuous messages is similar to that described with respect to FIG. 3C. However, the amount of time that market data distributor 140 waits before providing an enhanced market update is based on a minimum quote life ("MQL") of a submitted order. For instance, if an order received at time $t_R$ is deemed to be competitive, then market data distributor 140 may wait for a duration of the minimum quote life (e.g., an amount of time $t_S-t_R$) after receiving an enhanced message from matching engine 120 before providing an enhanced market data update Us. Alternatively, market data distributor 140 may wait for a duration of the minimum quote life (e.g., an amount of time $t_S-t_R$) after the competitive order has been received at ETV 110 before providing an enhanced market data update. In either instance, the minimum quote life may be predefined by an operator of the ETV 110. Alternatively or additionally, matching engine 120 may determine that a given order is competitive, and after the submission time of the order plus the minimum quote life transmit an enhanced message to a market data distributor 140, which then immediately (or in a delayed manner) generates and transmits an enhanced market data update for the market participant identified in the enhanced message. Either or both prevent a given market participant from "gaming" the system as previously described. In some implementations, if MQL is programmatically enforced by the ETV such that an order cannot be canceled until it has been active in the book for the period of its MQL, the submission of a competitive maker order may cause the sending of enhanced market data updates immediately (i.e., without the imposition of additional delays) to the submitter of the order.

Correlating Order Sessions with Market Data Update Sessions

Market participants 150 may logon to a market data distributor 140 to receive market data updates, in response to which the venue 110 may generate a data session 105. A given market data distributor 140 may be in communication with, and provide market data updates to, one or more market participants 150 (market data updates are provided to a device used by a market participant to logon to the venue 110, though for simplicity provision of information to market participants will be described herein throughout).

A market participant 150 may logon to receive market data updates from one or more market data distributors 140. Each logon may be associated with a data session. As such, at any given time, venue 110 may track which market participants 150 have logged on to receive market data updates (and which market data distributor 140 is providing such updates). Likewise, through the order sessions and/or order logs, venue 110 may track which market participants have submitted orders (because a given market participant may logon to an order gateway 130 to submit orders and to a market data distributor 140 to receive market data updates). In this manner, venue 110 may be able to correlate particular orders with a market participant who is receiving market data updates.

ETV 110 typically establishes two distinct types of connections to market participants 150: one type of connection for obtaining and processing orders via an order session, and a second type of connection for providing market data updates to market participants via a data session. For various reasons (e.g., fault tolerance, distribution of data to different systems, and so on) a single market participant 150 on ETV 110 may establish a plurality of data sessions 105 and separately a plurality of order sessions 103 to ETV 110 (as illustrated in FIG. 1).

When onboarding a market participant 150 onto ETV 110 for the first time, the market participant 150 is assigned a number of order sessions and a number of market data sessions consistent with their needs and the rules of the ETV 110 (which may limit the total number of sessions a single participant may use). Each such session may have a unique identifier that is provided to the market participant 150, which sends to the ETV 110 each time they establish such a session. If the sessions are FIX-based the unique identifier may be a SenderCompId, Username, SenderSubId, and/or other fields in a FIX message that can uniquely identify the session and/or market participant.

Upon initiating the session the market participant will send the unique identifier in the login message, typically (although not necessarily) also with a password or other credential. The Order Gateway 130, market data distributor 140, and/or other component may verify that the password and unique session identifier appears in an administration database of the ETV 110. If it does, then the session will be established. If it does not, the session will not be established, and an error message will be transmitted to the market participant over the session before it is forcibly closed by the ETV 110. Such closure may include terminating the TCP/IP connection.

If the session is established, and it is an order session, the order gateway 130 may insert into the payload of each order received the identifier of the session from which it originated. In this way, when the order reaches the matching engine 120, the sender (e.g., market participant) of each order is known. As the matching engine 120 transmits orders to the market data distributors 140, the sender of each order is also contained in that order message's payload.

Since a market data distributor 140 is in receipt of each order, and can know from each order message's payload its sender, and is also connected to the venue's administration database, and by way of the login message they have received from each data session they are hosting the unique identifier of that session, a market data distributor 140 may query the administration database for the association between an order session identifier and the data session identifier. If those two identifiers belong to the same market participant, then further computation may be required to determine if the order received is "competitively priced" or otherwise meets conditions for enhanced market data updates and if so to transmit enhanced market data updates on this session. If there is no association—i.e. the order was sent by a different market participant to that participant who established the market data session in question—then the submission of this order may not cause the given market data session to be sent more frequent or enhanced updates.

In summary, the administration database stores a mapping of unique order session identifiers to market participants 150, and similarly a mapping of unique data session identifiers to those same market participants on the ETV 110. By having the order gateway 130 insert the unique identifier of the session on which an order was received into the order messages it receives, and by forwarding this information "inline" with the order onto the matching engine 120, and ultimately onto the market data distributors 140, the market data distributors 140 are able to determine which orders were sent by which participants, and ultimately which market data sessions belong to those participants. The below represents representations of data stored in market participant database entries, order sessions entries, and data session entries in order to correlate market participants that have logged on to submit orders and logged on to receive market updates.

```
Table Participants {
  Participant_Id: integer [Primary Key]
  Participant_Name: string
}
Table OrderSessions {
  Session_Id: string [Primary Key]
  Participant_Id: integer [Foreign Key referencing
    Participants.Participant_Id]
  Session_Password: string
}
Table DataSessions {
  Session_Id: string [Primary Key]
  Participant_Id: integer [Foreign Key referencing
    Participants.Participant_Id]
  Session_Password: string
}
```

In some implementations, particularly on venues where trading occurs on a bilateral credit basis, the real-time market data updates provided may be for the unscreened book only, because it may be computationally too expensive to provide a credit screened book in real-time. Where a market participant can subscribe to both screened and unscreened market data e.g., through the use of two different symbols in the market data subscription request—one for each, only the unscreened symbol may update.

In some implementations, the market operator may further specify that additional or alternate conditions are met besides placing a competitively priced maker order so as to receive real-time market data e.g., such as sufficient bandwidth available on the participants connection to the venue, or that the participant be co-located with the venue.

In some implementations, the market operator may specify that instead of the single SenderCompId (e.g., user or credit code) being eligible for the real-time market data updates as a result of submitting a competitively priced maker order, the entire entity or firm to which that user or credit entity belongs is eligible to receive those updates. This may be implemented by performing a mapping inside the market data distributor from individual user or credit to parent entity, and doing a lookup inside that mapping to determine all the users/credit codes eligible to be sent the real-time data on the basis of membership to the same entity/firm as the maker order submitting user.

The various components illustrated in FIG. 1 may communicate with one another via one or more communication links (represented by lines between such components). The communication links may include network links through a network described herein. The various communication links are shown for illustration and not limitation, as one or more communication links between components not otherwise illustrated may be used as well.

In an exemplary operation, market participants 150 send in orders (including cancels, amendments, etc.) to venue 110 over the network, and receive market data updates from the venue over the network. In either case, the traffic maybe bi-directional (e.g., order-related traffic may be sent from venue 110 to participants 150 as execution reports for orders, and market data-related traffic maybe sent from participants 150 to venue 110 as subscription requests for specific instruments). Order-related network traffic is routed by a switch (not illustrated), which may be implemented as a conventional network switch device, to one or more of the order gateway(s) 130. Market data-related network traffic may be provided by market data distributor 140 and is routed by the switch to participants 150.

A mapping from IP addresses to individual participant 150 (since a single participant may use a plurality of IP addresses to connect to venue 110), and mappings from IP addresses to specific components in venue 110 (e.g., to a certain order gateway 130 or market data distributor 140 may be written to a venue database (not illustrated).

In an implementation, ETV 110 (and other components of ETV 110) may be implemented in the Java™ programming language. Other programming languages may be used as well. The individual components of ETV 110 may be implemented as separate processes on separate hosts (computers) and communicate as indicated over a computer network using the TCP/IP protocol or other network protocol.

Figure 2:
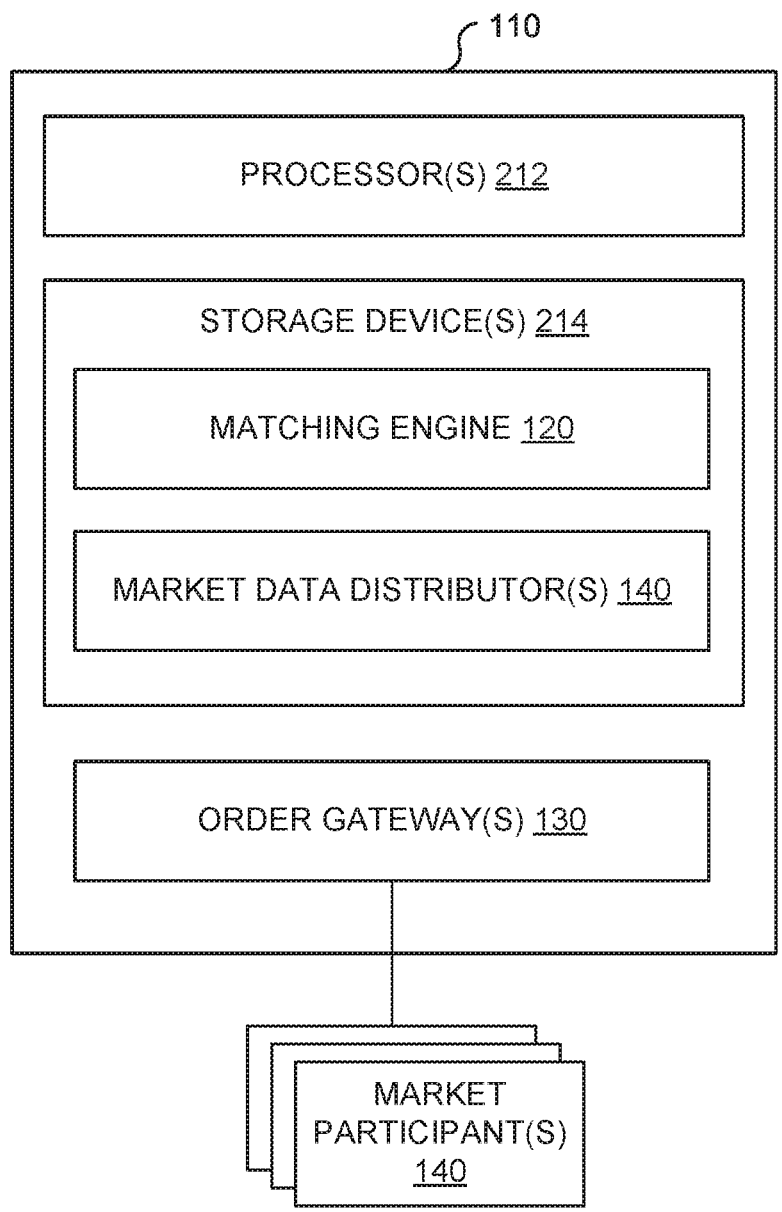
FIG. 2 depicts an exemplary ETV that increases the transmission frequency of and/or other enhancements to market data updates for market participants that submit competitive maker orders as compared to market participants that do not submit competitive maker orders, according to an implementation of the invention.

FIG. 2 depicts an exemplary ETV 110 that increases the transmission frequency of and/or other enhancements to market data updates for market participants that submit competitive maker orders as compared to market participants that do not submit competitive maker orders, according to an implementation of the invention.

ETV 110 may be configured as one or more servers (e.g., having one or more server blades, processors, etc.), one or more computers (e.g., a desktop computer, a laptop computer, etc.), and/or other device that is programmed to process code orders. In an implementation, ETV 110 may be configured as a cluster of commodity computing hardware programmed by various computer program instructions. For instance, the cluster may execute Apache™ Hadoop® software. In these implementations, orders and data sessions database 124 (in reference to FIG. 1) may be implemented via the Hadoop Filesystem (HDFS) on this cluster and the instruction(s) that programs ETV 110 may be implemented to use the MapReduce API and HDFS-client API provided by Hadoop, and in the Java™ programming language.

Regardless of its particular implementation or configuration, ETV 110 may include one or more processors 212 (also interchangeably referred to herein as processors 212, processor(s) 212, or processor 212 for convenience), one or more storage devices 214 (which may store various instructions that program processors 212), and/or other components. Processors 212 may be programmed by one or more computer program instructions. The computer program instructions may include, without limitation, matching engine 120, market data distributor 140, order gateway 130, and/or other instructions that program ETV 110 to perform various operations, which are described in greater detail herein. As used herein, for convenience, the various instructions will be described as performing an operation, when, in fact, the various instructions program the processors 212 (and ETV 110) to perform the operation. Alternatively or additionally, any one of the foregoing components of ETV 110 may include hardware, including specialized networking hardware configured to receive and process code orders.

Figure 4:
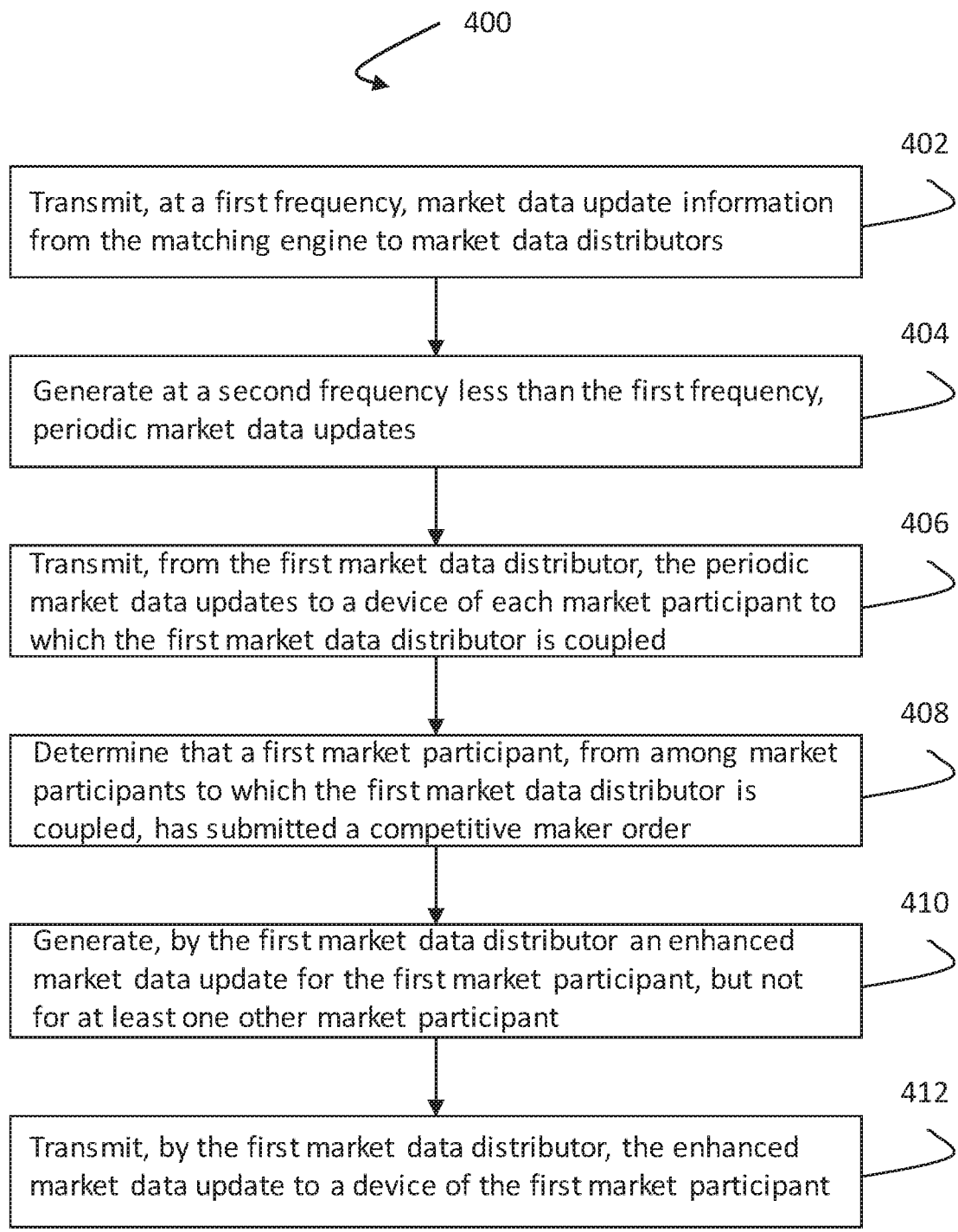
FIG. 4 illustrates an exemplary process for increasing the transmission frequency of and/or other enhancements to market data updates for market participants that submit competitive maker orders as compared to market participants that do not submit competitive maker orders, according to an implementation of the invention.

FIG. 4 illustrates an exemplary process 400 for increasing the transmission frequency of and/or other enhancements to market data updates for market participants that submit competitive maker orders as compared to market participants that do not submit competitive maker orders, according to an implementation of the invention.

In an operation 402, process 400 may include transmitting, at a first frequency, market data update information from the matching engine to the one or more market data distributors, wherein the market data update information reflects a state of an order book at a given time.

In an operation 404, process 400 may include generating, by the first market data distributor, at a second frequency less than the first frequency, periodic market data updates, the periodic market data updates including at least a first market data update based on first market data update information available to the first market data distributor at a first time and a second market data update based on second market data update information available to the first market data distributor at a second time, wherein a time between the first time and the second time is based on the second frequency.

In an operation 406, process 400 may include transmitting, from the first market data distributor, the periodic market data updates to a device of each market participant to which the first market data distributor is coupled.

In an operation 408, process 400 may include determining that a first market participant, from among market participants to which the first market data distributor is coupled, has submitted a competitive maker order relating to a first instrument. Such determination may be made by a matching engine 120 and/or a market data distributor 140.

In an operation 410, process 400 may include generating, by the first market data distributor, based on the determination that the first market participant has submitted the competitive maker order, an enhanced market data update for the first market participant, but not for at least one other market participant.

In an operation 412, process 400 may include transmitting, by the first market data distributor, the enhanced market data update to a device of the first market participant, wherein the first market data distributor does not transmit the enhanced market data update to another device of the at least one other market participant.

FIG. 5 illustrates an exemplary process 500 for determining whether to provide enhanced market data updates, according to an implementation of the invention.

In an operation 502, process 500 may include, listening for new orders (e.g., order messages received at an order gateway 130). Upon receipt of each order-related message (e.g., cancel, cancel-replace, new order, etc) at the matching engine 120, in an operation 504, process 500 may include making a copy of the state of the Limit Order Book prior to processing that order-related message against it.

In an operation 506, process 500 may include processing the order. Such processing is often referred to as "matching", and ETV 110 typically discloses its rules for matching via a rulebook i.e., how bids and offers will be inserted into the Limit Order Book, what will cause a bid and offer to match, and which bids and offers will receive priority when there is a plurality of candidates for matching a buy with a sell, and vice versa. The copy of the Limit Order Book prior to the matching of a new order-related message is subsequently used to determine which specific orders were at top of book pre-matching, but are no longer at top of book post-matching. The copy is similarly used to determine which orders are at top of book post-matching, that were not at top pre-matching.

Venues are typically implemented such that the market participant that sent an order is identified in the payload of the order's message. In this manner, market participants that submitted orders that were previously at the top of book but are no longer at the top of book can be identified (so that enhanced messages can be terminated for those market participants). Likewise, market participants that submitted orders that are currently at the top of book but previously were not at the top of book can be identified (so that enhanced messages for those market participants can be initiated).

As such, in an operation 508, process 500 may include determining whether participants that were at the top of book in the copy (or other condition for being provided with enhanced market updates), but are no longer at the top of book, may be made. If so, upon identifying these participants, in an operation 510, process 500 may transmit "cease real-time" messages for the identified participants.

In an operation 512, process 500 may include determining whether participants are currently at the top of book in the copy (or other condition for being provided with enhanced market updates) and were not previously at the top of book. If not, processing may return to operation 502. If yes, in an operation 514, process 500 may include transmitting "begin real-time" messages. These messages may be sent from the matching engine 120 to the market data distributors 140. The payload of these the begin or cease real-time messages may contain the participant's identifier (e.g., as it appears in the SenderCompId field of the FIX order message they sent), the instrument (e.g., as it appears in the Symbol field of the FIX order message they sent), and a flag to indicate the "begin" or "cease" (as appropriate) on the real-time market data.

As previously described, ETV 110 is implemented such that participants 150 login to the market data distributors 140 with the same identifier they use to login to the order gateways 130, so in this way the market data distributors 140 are cognizant of the participant to which each market data stream is being sent. Hence the market data distributors 140 "know" which specific (e.g., TCP/IP) market data connection to begin or cease sending real-time price updates on.

Figure 6:
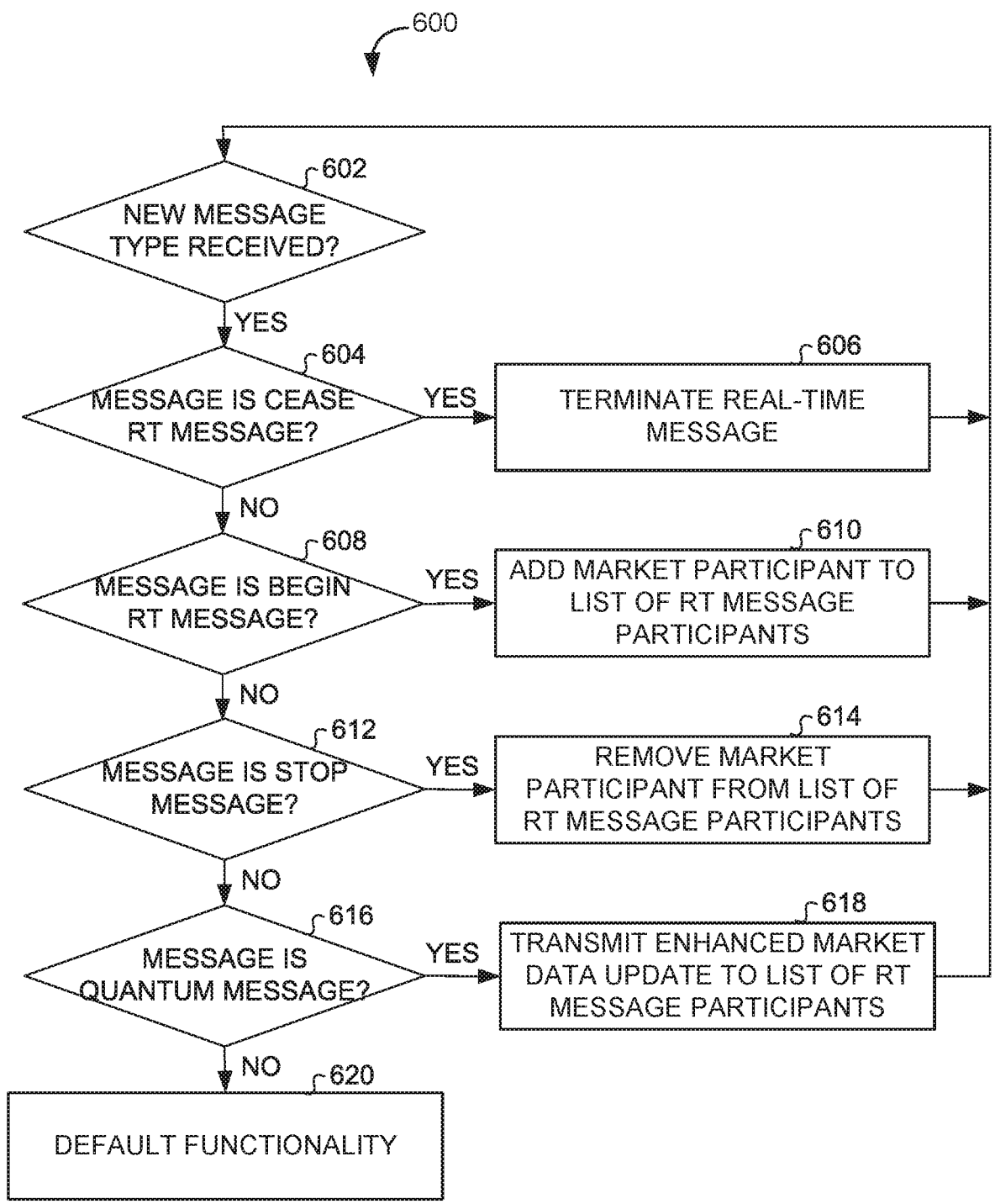
FIG. 6 illustrates an exemplary process for initiating or terminating enhanced market data updates, according to an implementation of the invention.

FIG. 6 illustrates an exemplary process 600 for initiating or terminating enhanced market data updates, according to an implementation of the invention.

In an operation 602, process 600 may include determining whether a new message type has been received.

In an operation 604, upon receipt of a new message type from the matching engine 120 (recall the market data distributes receive other, existing message types such as the those containing the state of the Limit Order Book as it changes, and the quantum message indicating that participants should be sent a market data update at this time), process 600 may include examining the payload of the message to determine whether the new message type is a "cease" real-time message.

In an operation 606, if the message is a cease real-time message, process 600 may include terminating provision of an enhanced market data updates (e.g., to a market participant identified in the cease real-time message).

If the message is not a cease real-time message, in an operation 608, process 600 may include determining whether the message is a "begin" real-time market data message. If yes, then in an operation 610, process 600 may include adding the market participant identified in the begin real-time market data message to a list of participants that should be provided with enhanced market data updates for the instrument also identified in the "begin" real-time market data message. The market data distributor will then wait for the next quantum message before transmitting an enhanced market data update to appropriate participants.

If the message is not a "begin" real-time market data message, then in an operation 612, process 600 may include determining whether the message is a "stop" real-time market data message. If yes, then in an operation 614, process 600 may include removing the market participant identified in the stop real-time market data message from a list of participants that should be provided with enhanced market data updates for the instrument also identified in the "stop" real-time market data message.

If the message is not a begin real-time message, in an operation 616, process 600 may include determining whether the message is a quantum message. If yes, then in an operation 618, process 600 may include transmitting an enhanced market data update to participants on the list of participants that should be provided with enhanced market data updates for the instrument also identified in the quantum message.

If the message is not a quantum message, in an operation 620, process 600 may provide default functionality, such as providing an unrecognized message error.

If the new message type received is a "begin" real-time market data message, with the same implicit assumptions about the participant being connected to that the market data distributor and subscribed to that instrument, then the market data distributor will wait for the next quantum message before commencing the sending real-time market data to that participant. If the next message received is not a quantum message but rather a "stop" real-time message for that participant and instrument, then real-time market data will not be sent to the participant, and the market data distributor will repeat the logic from the beginning to determine when (or if) at some future point in time the participant will again be eligible to receive real-time market data for the instrument.

The foregoing processing operations presented in FIG. 6 may, among other things, defend against a market participant 150 who may attempt to obtain enhanced market data updates without substantially improving liquidity or otherwise meeting the conditions to obtain such enhanced market data updates by sending a maker order then immediately canceling it.

This specific behavior (i.e., submitting a new top of book maker order and immediately canceling it) would not reward a market participant with enhanced market data updates because, as it is specified, such enhanced market data updates will not commence until the market data "quantum" after the maker order has been submitted. Put another way, a participant submitting and canceling a maker order between two consecutive quantums will not be eligible to receive real-time data responsive to the submission of that order.

As used herein, the term "market participant" (or simply "participant") is intended to be broadly construed to refer to any entity that receives (through a computing device) market data from the venue, or sends (through a computing device) order-related messages to the venue, including, but not limited to: a firm that conducts business on the electronic trading venue, a credit entity associated with such a firm (a single firm may have a plurality of credit entities), or a user (human or otherwise). In the foregoing text, the user of the invention will select the specific form of participant to which methodology will apply.

Although illustrated in FIG. 1 as a single component, ETV 110 may include a plurality of individual components (e.g., computer devices) each programmed with at least some of the functions described herein. The one or more processors 212 may each include one or more physical processors that are programmed by computer program instructions. The various instructions described herein are exemplary only. Other configurations and numbers of instructions may be used, so long as the processor(s) 212 are programmed to perform the functions described herein. Furthermore, it should be appreciated that although the various instructions are illustrated in the figures as being co-located within a single processing unit, in implementations in which processor(s) 212 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 212 may be programmed by one or more additional instructions that may perform some or all of the functionality attributed herein to one of the instructions.

The various instructions described herein may be stored in a storage device 214, which may comprise random access memory (RAM), read only memory (ROM), and/or other memory. The storage device may store the computer program instructions (e.g., the aforementioned instructions) to be executed by processor 212 as well as data that may be manipulated by processor 212. The storage device may comprise floppy disks, hard disks, optical disks, tapes, or other storage media for storing computer-executable instructions and/or data.

Orders and data sessions database 124 may be, include, or interface to, for example, an Oracle™ relational database sold commercially by Oracle Corporation. Other databases, such as Informix™, DB2(Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other figures, different numbers of entities than those depicted may be used. Furthermore, according to various implementations, the components described herein may be implemented in hardware and/or software that configure hardware.

The various processing operations and/or data flows depicted in the figures are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail above) are exemplary by nature and, as such, should not be viewed as limiting. As used herein, the term "exemplary" is meant to denote "example of."

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for managing enhanced market data updates in an electronic trading venue, an enhanced market data update from the enhanced market data updates comprising a market data update that is provided to at least one market participant, but is not provided to at least one other market participant and includes a characteristic that is not included in a general market data update generally available to other market participants, the system comprising:
  one or more market data distributors that include at least a first market data distributor; and
  one or more physical processors programmed by computer program instructions that include a matching engine configured to receive market orders via at least one order gateway, maintain one or more order books, and provide market data updates to market data distributors, the market data distributors including the one or more market data distributors, wherein, when executed by the one or more physical processors, the computer program instructions program the system to:
    transmit, at a first frequency, market data update information from the matching engine to the one or more market data distributors, wherein the market data update information reflects a state of an order book at a given time;
    generate, by the first market data distributor, at a second frequency less than the first frequency, periodic market data updates, the periodic market data updates including at least a first market data update based on first market data update information available to the first market data distributor at a first time and a second market data update based on second market data update information available to the first market data distributor at a second time, wherein a time between the first time and the second time is based on the second frequency;

receive, by the first market data distributor, a login from a first market participant to the first market data distributor;

establish, by the first market data distributor, a market data update session with the first market participant in response to the login;

store a log of market data update sessions that associates individual market participants with a given market data update session;

transmit, from the first market data distributor, the periodic market data updates to devices of market participants in which the first market data distributor is in communication, wherein the market participants include at least the first market participant, and wherein the first market data distributor provides the periodic market data updates to the first market participant via the market data update session;

establish, by the at least one order gateway, one or more order sessions with the one or more of the market participants;

receive market orders via the at least one order gateway and order sessions from one or more of the market participants, wherein the market orders include at least a first competitive maker order relating to a first instrument;

determine that the first market participant to which the first market data distributor provides market data updates submitted the first competitive maker order based on a unique identifier associated with the first market participant included within the first competitive maker order, wherein the first competitive maker order was submitted via the one or more order sessions, and the one or more order sessions comprise a different session from the market data update session;

determine that the first competitive maker order submitted by the first market participant qualifies as a first triggering event to provide the first market participant the enhanced market data updates;

generate, by the first market data distributor, based on the determination of the first triggering event, a first enhanced market data update for the first market participant, but not for at least one other market participant that has not submitted a second competitive maker order;

identify, from the log, the market data update session associated with the first market participant via which the periodic market data updates are provided based on the unique identifier;

transmit, by the first market data distributor, the first enhanced market data update to a device of the first market participant, wherein the first market data distributor provides the first enhanced market data update to the first market participant via the identified market data update session, and wherein the first market data distributor does not transmit the first enhanced market data update to a device of the at least one other market participant, wherein, after determining that the first market participant has submitted the first competitive maker order, the system is further programmed to determine a first time period to wait measured between the determination that the first market participant has submitted the first competitive maker order and the transmitting of the first enhanced market data update to the device of the first market participant, and to wait the first amount of time prior to transmitting the first enhanced market data update to the device of the first market participant.

2. The system of claim 1, wherein to generate the periodic market data updates, the system is further programmed to:
initiate, by the first market data distributor, an electronic timer each time a market data update is generated or transmitted, wherein the periodic market data updates are generated based on the electronic timer and the second frequency.

3. The system of claim 1, wherein to generate the periodic market data updates, the system is further programmed to:
generate and transmit, from the matching engine, periodically at the second frequency, a multicast message to each of the one or more market data distributors, the multicast message instructing each of the one or more market data distributors to provide a market data update to each device of each market participant to which it is in communication, wherein the periodic market data updates are generated by the first market data distributor in response to receipt of the multicast message from the matching engine.

4. The system of claim 3, wherein the first market participant is determined to have submitted the first competitive maker order by the matching engine, and wherein the system is further programmed to:
transmit, by the matching engine, an enhanced data update message distinct from any multicast message, to the one or more market data distributors, the enhanced data update message identifying the first market participant and indicating that the first market participant should be provided with the first enhanced market data update.

5. The system of claim 4, wherein the first enhanced market data update comprises a market data update that is provided at a frequency greater than the second frequency, wherein in response to receipt of the enhanced data update message from the matching engine, the first market data distributor generates a third market data update based on market data update information available to it at a third time after the first time and before the second time.

6. The system of claim 4, wherein the enhanced data update message comprises a market data update that includes additional information not included in a given market data update provided to the at least one other market participant.

7. The system of claim 6, wherein the additional information comprises at least one of: information showing all trades, information showing additional order depth, or information that shows market by order instead of market by price.

8. The system of claim 4, wherein the enhanced data update message is transmitted from the matching engine together with a given multicast message or separate from any multicast message.

9. The system of claim 3, wherein the system is further programmed to:
transmit, from the matching engine, a cease message to the first market data distributor, the cease message identifying the first market participant and indicating that the first market participant should no longer receive the enhanced market data updates; and in response to receipt of the cease message, terminate, by the first market data distributor, transmission of further enhanced market data updates to the first market participant.

10. The system of claim 1, wherein the first market participant is determined, by the first market data distributor, to have submitted the first competitive maker order, and wherein the first enhanced market data update comprises a market data update that is provided at a frequency greater than the second frequency, the system further programmed to:
in response to the determination that the first market participant submitted the first competitive maker order, the first market data distributor generates a third market data update based on market data update information available to it at a third time after the first time and before the second time.

11. The system of claim 1, wherein the first market participant is determined, by the first market data distributor, to have submitted the first competitive maker order, and wherein the first enhanced market data update comprises a market data update that includes additional information not included in a given market data update provided to the at least one other market participant.

12. The system of claim 11, wherein the additional information comprises at least one of: information showing all trades, information showing additional order depth, or information that shows market by order instead of market by price.

13. The system of claim 1, wherein the system is further programmed to:
determine, by the first market data distributor, that the first market participant is subscribed to receive market data updates, wherein the first market data distributor transmits a separate market data update to the first market participant in response to the determination that the first market participant is subscribed to receive market data updates.

14. The system of claim 1, wherein the first competitive maker order comprises a sell or buy order.

15. The system of claim 1, wherein the first time period is until the next instance of market data update information being transmitted from the matching engine to the first market data distributor.

16. The system of claim 1, wherein the first time period is determined using a minimum quote life value provided by the first market participant with the first competitive maker order.

17. A computer-implemented method for managing enhanced market data updates, in an electronic trading venue, an enhanced market data update from the enhanced market data updates comprising a market data update that is provided to at least one market participant, but is not provided to at least one other market participant and includes a characteristic that is not included in a general market data update generally available to other market participants, the method being implemented on a computer system having one or more physical processors programmed by computer program instructions that include at least a matching engine, wherein, when executed by the one or more physical processors, the computer program instructions program the computer system to perform the method, the method comprising:
transmitting, by the computer system, at a first frequency, market data update information from the matching engine to one or more market data distributors, wherein the one or more market data distributors include at least a first market data distributor, and wherein the market data update information reflects a state of an order book at a given time;
generating, by the first market data distributor, at a second frequency less than the first frequency, periodic market data updates, the periodic market data updates including at least a first market data update based on first market data update information available to the first market data distributor at a first time and a second market data update based on second market data update information available to the first market data distributor at a second time, wherein a time between the first time and the second time is based on the second frequency;
receiving, by the first market data distributor, a login from a first market participant to the first market data distributor;
establishing, by the first market data distributor, a market data update session with the first market participant in response to the login;
storing, by the computer system, a log of market data update sessions that associates individual market participants with a given market data update session;
transmitting, from the first market data distributor, the periodic market data updates to devices of market participants in which the first market data distributor is in communication, wherein the market participants include at least the first market participant, and wherein the first market data distributor provides the periodic market data updates to the first market participant via the market data update session;
establishing, by at least one order gateway, one or more order sessions with the one or more of the market participants;
receiving, via the at least one order gateway and the one or more order sessions, market orders from one or more of the market participants, wherein the market orders include at least a first competitive maker order relating to a first instrument;
determining, by the computer system, that the first market participant to which the first market data distributor provides market data updates submitted the first competitive maker order based on a unique identifier associated with the first market participant included within the first competitive maker order, wherein the first competitive maker order was submitted via the one or more order sessions, and the one or more order sessions comprise a different session from the market data update session;
determining that the first competitive maker order submitted by the first market participant qualifies as a first triggering event to provide the first market participant the enhanced market data updates;
generating, by the first market data distributor, based on the determination of the first triggering event, a first enhanced market data update for the first market participant, but not for at least one other market participant that has not submitted a second competitive maker order;
identifying, by the first market data distributor, the market data update session associated with the first market participant from the log via which the periodic market data updates are provided based on the unique identifier; and
transmitting, by the first market data distributor, the first enhanced market data update to a device of the first market participant, wherein the first market data distributor provides the first enhanced market data update to the first market participant via the identified market data update session, and wherein the first market data distributor does not transmit the first enhanced market data update to a device of the at least one other market participant, wherein, after determining that the first market participant has submitted the first competitive maker order, the computer system is further programmed to determine a first time period to wait measured between the determination that the first market participant has submitted the first competitive maker order and the transmitting of the first enhanced market data update to the device of the first market participant, and to wait the first amount of time prior to transmitting the first enhanced market data update to the a device of the first market participant.

18. The method of claim 17, wherein generating the periodic market data updates comprises:

initiating, by the first market data distributor, an electronic timer each time a market data update is generated or transmitted, wherein the periodic market data updates are generated based on the electronic timer and the second frequency.

19. The method of claim 17, wherein generating the periodic market data updates comprises:

generating and transmitting, from the matching engine, periodically at the second frequency, a multicast message to each of the one or more market data distributors, the multicast message instructing each of the one or more market data distributors to provide a market data update to each device of each market participant to which it is in communication, wherein the periodic market data updates are generated by the first market data distributor in response to receipt of the multicast message from the matching engine.

20. The method of claim 19, wherein the first market participant is determined to have submitted the first competitive maker order by the matching engine, and wherein the method further comprises:

transmitting, by the matching engine, an enhanced data update message distinct from any multicast message, to the one or more market data distributors, the enhanced data update message identifying the first market participant and indicating that the first market participant should be provided with the first enhanced market data update.

21. The method of claim 20, wherein the first enhanced market data update comprises a market data update that is provided at a frequency greater than the second frequency, wherein in response to receipt of the enhanced data update message from the matching engine, the first market data distributor generates a third market data update based on market data update information available to it at a third time after the first time and before the second time.

22. The method of claim 17, wherein the first time period is until the next instance of market data update information being transmitted from the matching engine to the first market data distributor.

23. The method of claim 17, wherein the first time period is determined using a minimum quote life value provided by the first market participant with the first competitive maker order.

* * * * *